April 28, 1959 R. B. McASHAN, JR 2,883,834
AUTOMATIC SHUT-OFF DEVICE
Filed June 15, 1956 2 Sheets-Sheet 1

Robert B. McAshan, Jr.
INVENTOR.

BY Browning, Simms & Hyer
ATTORNEYS

April 28, 1959
R. B. McASHAN, JR
2,883,834
AUTOMATIC SHUT-OFF DEVICE
Filed June 15, 1956
2 Sheets-Sheet 2
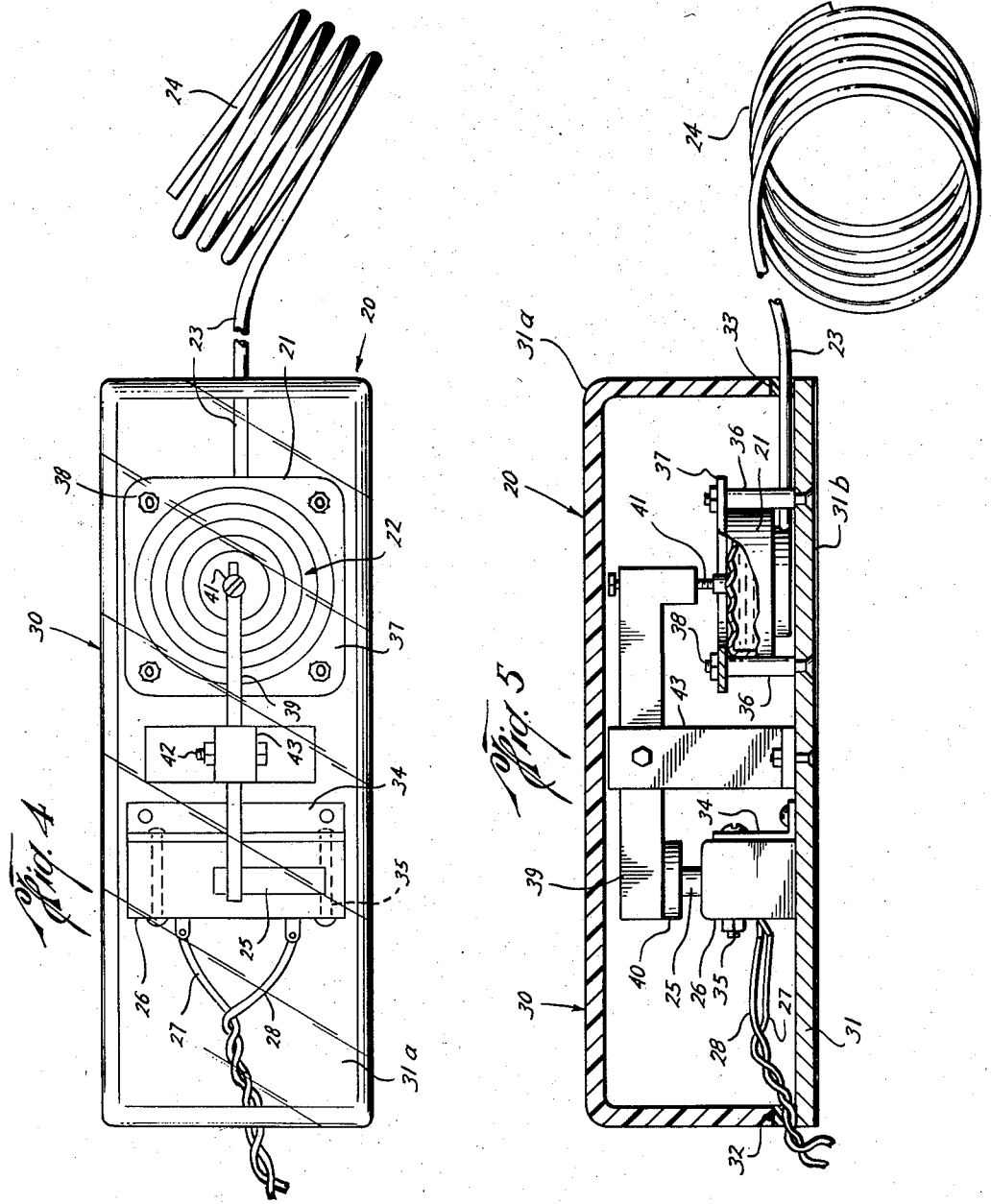
Robert B. McAshan, Jr.
INVENTOR.
BY
Browning, Simms & Hyer
ATTORNEYS

United States Patent Office 2,883,834
Patented Apr. 28, 1959

2,883,834

AUTOMATIC SHUT-OFF DEVICE

Robert B. McAshan, Jr., Dallas, Tex.

Application June 15, 1956, Serial No. 591,741

2 Claims. (Cl. 62—55)

This invention relates to a novel device for use in automatically shutting off the delivery of a compressed liquified gas, such as butane or propane, to a storage tank when the liquid has reached a predetermined level within the tank.

In the distribution of propane and butane, the storage tanks of the consumer are filled from delivery trucks by means of pumps powered by suitable take-off mechanism on the truck. It is necessary in filling the tanks to leave a vapor space above the liquid level, preferably in the upper 10% to 15% of the tank. For this purpose, such tanks are provided with a means for visually indicating to the deliveryman that the liquid has reached the desired level within the tank so that he may shut off its delivery.

This means conventionally comprises a gauge on the tank at about the 85 or 90% level consisting of a valve fitting projecting from the outer wall of the tank and having a small outlet through which the liquid may escape when reaching such level. The liquid, in expanding from within the tank, will immediately vaporize and undergo a drop in temperature to about −40° F. to −120° F., depending on ambient air temperature and other conditions. This large drop in temperature freezes small droplets of water in the atmosphere, which causes a snow-like display indicating to the deliveryman that the desired level has been reached and that filling should be stopped. As a practical matter, however, the deliveryman does not always pay strict attention to this display and the tanks are frequently filled beyond the desired level.

The principal object of the present invention is to provide a device for use in automatically shutting off filling of the tank at the desired level, regardless of the attention or inattention of the deliveryman.

Another object is to provide a device of this type which is operable in response to the above-described phenomenon so as to require no substantial alteration to either the delivery truck or the existing structure of the storage tanks.

Still another object is to provide a device of the character described in the foregoing object which consists of a minimum number of parts and is of a simplified and compact construction.

Other objects, advantages and features of this invention will be apparent to one skilled in the art upon a consideration of the written specification, the attached claims and the annexed drawings.

In the drawings, wherein like reference characters are used throughout to designate like parts:

Figs. 4 and 5 are top plan and longitudinal sectional views, respectively, of the device.

Figure 1:
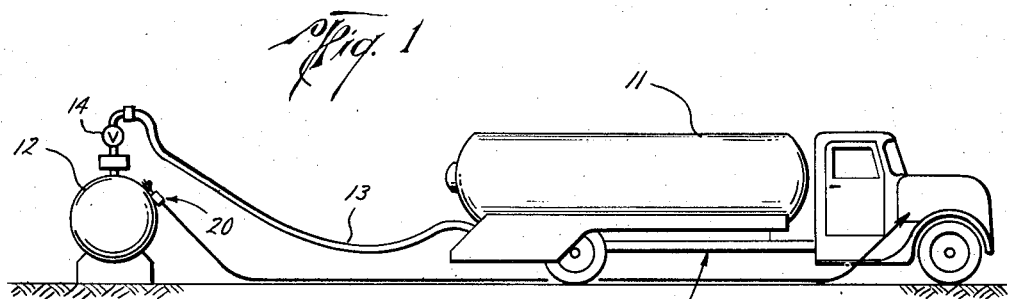
Fig. 1 is an elevational view of a storage tank in the process of being filled from a delivery tank.

Referring now particularly to the above-described drawings, there is shown in Fig. 1 a typical delivery truck 10 which conventionally may be provided with the aforementioned take-off mechanism for powering a pump (neither of which are shown) to deliver compressed liquified gas, such as butane and propane, from its mobile tank 11 to the storage tank 12. For this purpose, a flexible hose 13 is extended between the discharge side of the pump on the truck and a filling valve 14 on the nozzle end of the hose having Acme-type threads for connection to a spring-loaded check valve 14a on the upper end of the tank.

In the past, it has been the practice to fill the tank by first opening the hose valve 14 so that, with the truck motor running and the power take-off engaged, the pumped gas will automatically open and flow past the spring-loaded check valve 14a on the tank. Delivery of the gas is stopped by closing of the filling valve 14. In this manner, the tank valve 14a will close automatically as the valve 14 is uncoupled therefrom, and the only lost gas will be that between the valve 14 and the end of the nozzle.

As previously mentioned, however, filling of the tank 11 to the desired level in accordance with the above-described practice is dependent upon the deliveryman's attention and prompt action responsive to the aforementioned snow-like display. Furthermore, the deliveryman must then hurry to the truck so as to stop the pump by either disengaging the power take-off mechanism or shutting off the truck ignition. Therefore, even assuming that the deliveryman is diligent in first shutting off the filling valve 14 and then stopping the pump, there is an interim period in which the gas may be heated and vaporized during by-passing of the pump.

Figure 2:
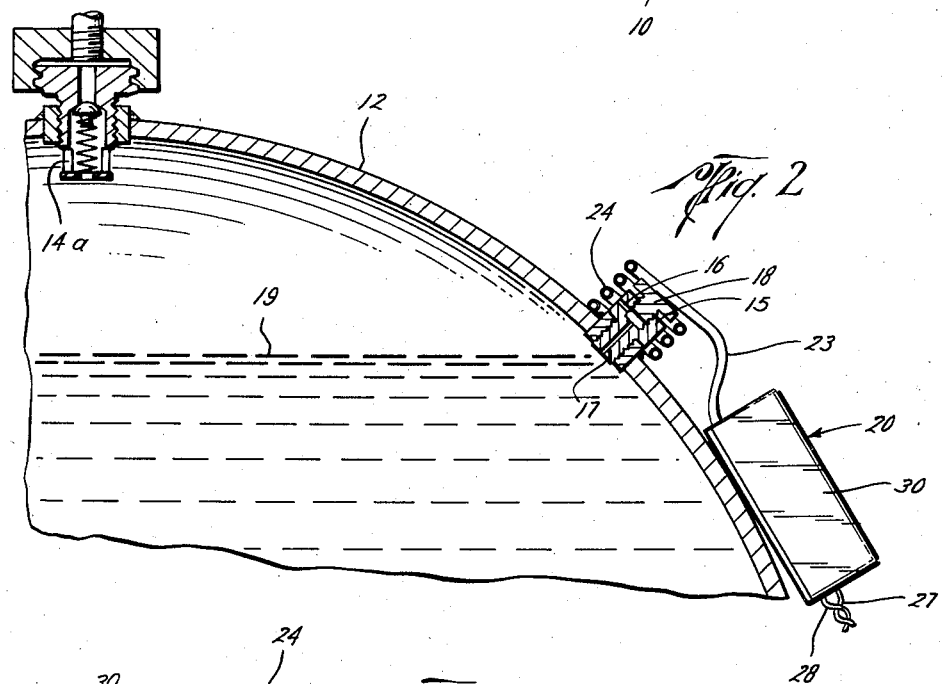
Fig. 2 is an enlarged partial sectional view of the tank, with the device of the present invention operably attached thereto.

As best shown in Fig. 2, the tank is provided at about the 85 or 90% level thereof with a valve which includes a valve body 15 fitted within and projecting from the outer wall of the tank and a passageway 17 therethrough including a lateral outlet 16 normally of No. 58 drill size. As can be seen from Fig. 2, the outlet 16 may be selectively opened or closed by means of screw-threaded valve member 18. Thus, it has been the practice heretofore in filling such a tank to open the outlet 16 so that when the liquid 19 reaches a level within the tank where it will escape through the valve, the cold vapor resulting therefrom will freeze particles of water in the atmosphere to form a snow-like display, as aforementioned, and thus indicate to the deliveryman that filling should be stopped.

An illustrative embodiment of the automatic shutoff device of the present invention is indicated in its entirety by the reference character 20 and can be seen from Figs. 4 and 5 to include temperature responsive means in the form of a fluid container 21 having a diaphragm 22 and a hollow tube 23 closed at one end and communicating at its other end with the fluid container. The closed end of the tube is provided with a coiled portion 24 or other suitable means for attaching the device to the projecting valve body in such a position that the vapor escaping from the opening 16 therethrough will impinge upon the tube, as shown in Fig. 2. The container and tube are filled with a fluid which is responsive to the temperature drop occasioned by the impingement of the cold vapor on the tube to permit the diaphragm 22 to contract from an expanded position (not shown) to the collapsed position shown in the drawings.

The diaphragm 22 is connected, in a manner to be described, to a plunger 25 of a conventional type microswitch 26 having contact elements (see Fig. 3) responsive to actuation of the plunger by the diaphragm for opening and closing an electrical circuit to which said contact elements are connectable. More particularly, under ordinary conditions with the diaphragm 22 in an expanded position the plunger 25 is depressed so as to engage such elements and close the circuit. On the other hand, upon contraction of the diaphragm in response to the escape of vapor due to the filling of the tank to a desired level, the plunger 25 of the micro-switch 26 will be released from engagement therewith so as to open the circuit.

Figure 3:
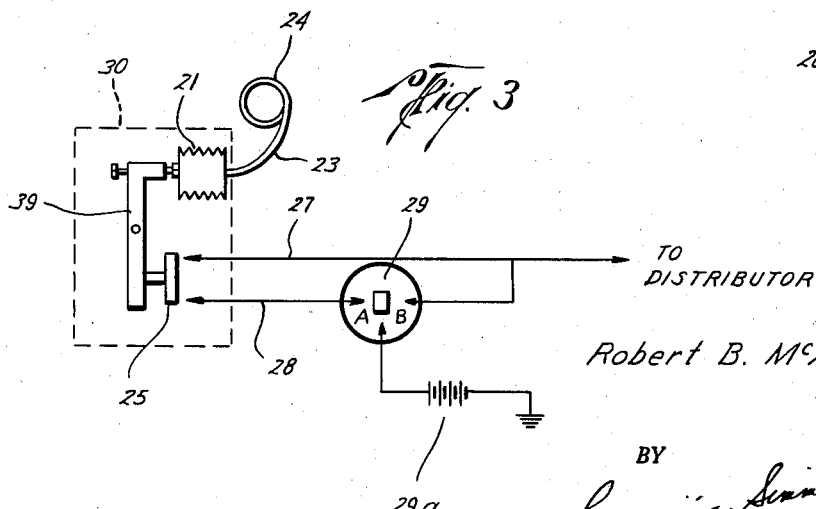
Fig. 3 is a schematic view of the manner in which this device may be electrically connected to the ignition system of the delivery truck.

As illustrated diagrammatically in Fig. 3, electrical lead lines 27 and 28 from the contact elements of the micro-switch connect with the distributor of the delivery truck and an ignition switch which is illustrated diagrammatically at 29, and which in turn is connected to the grounded battery 29a of the truck. The switch 29 is provided with alternate positions "A" and "B," the position "B" being the one used when the truck motor is running and filling first begins. At that time, the switch may be turned to position "A" whereby the closed circuit provided by the closing of the micro-switch due to depressing of the plunger 25 will maintain the motor and pump from the power take-off in a running position. However, at such time that the liquid reaches the desired level in the tank and the diaphragm 22 is contracted, the micro-switch 26 will be opened so as to shut down the truck motor and pump for the liquid.

It will also be noted that in the event of malfunctioning of either its mechanical or electrical components, the shut-off device of this invention will prevent filling of the tank, as distinguished from over-filling same. Thus, both leakage of fluid from the container 21 or tube 23 and disconnection of the wires 27 or 28 will result in an open circuit to stop the pump.

As previously mentioned, the power take-off mechanism and pump for filling the tank are conventional equipment, and therefore need not be illustrated. Similarly, the ignition switch 29 may be of a type conventionally used on vehicles, the position "A" being provided for the operation of electrical accessories, such as heaters, radios and the like when the motor is shut off.

As shown in Figs. 4 and 5, the fluid container 21 of the temperature responsive means and the micro-switch 26 are enclosed within an explosion-proof box 30, which includes a metal base plate 31, upon which the container and switch box are supported, and a plastic cover 31a which may be transparent, as illustrated, and suitably bonded to the base plate in sealed vapor tight relation. The lead lines 27 and 28 from the switch box and the tube 23 from the fluid container are extended outwardly of the box through openings 32 and 33, respectively, and the spaces surrounding the lines and tubes in the openings are filled with an epoxy resin or the like to render the box explosion proof.

The micro-switch 26 is fixedly mounted on the base plate 31 by means of an angle bracket 34 and mounting screws 35. Fluid container 21, on the other hand, is supported by spacer bushings 36 in raised position above the base plate so that the tube 23 may connect with and extend laterally from its bottom side, as shown in Fig. 5. Thus, an upper flanged portion 37 of the container surrounding the diaphragm 22 is supported upon the upper end of the bushings, and mounting screws 38 are extended through the bushings 36 to hold the container in place.

Preferably the connection between the diaphragm 22 and plunger 25 of the micro-switch comprises a lever 39 pivotally mounted from the base plate of the box 30 intermediate a head 40 at one end for engagement with the plunger and an adjustment screw 41 at its opposite end for engagement with the diaphragm. More particularly, the lever 39 is pivotally mounted on a spindle 42 supported at opposite ends in a U shaped bracket 43 fixed to base plate 31 of the box.

While the lever itself may comprise any suitable material, such as aluminum, the head 40 comprises a thin strip of Bakelite or other electrically non-conductive material. The adjusting screws 41 is threadedly received through the end of the level and may be adjusted in either direction to provide the desired relation between the contraction of diaphragm 22 and raising of plunger 25 to open the circuit, as previously described. Thus, it is contemplated that under ordinary temperature conditions, the fluid within the tube 23 and container 21 will have expanded the diaphragm 22 sufficiently to close the switch and circuit connected to the truck ignition. However, when the liquid within the tank reaches the level of the valve on the tank and escapes therefrom, the fluid will be cooled to such an extent that it will permit the diaphragm to contract and the lever to be rocked about its pivotal mounting to release the plunger 25.

Although many different fluids may be used, Freon F-112 gas has been found particularly well suited for the purposes of this invention. Such a gas not only has high heat conductivity and a low freezing point, but also is non-inflammable and non-corrosive.

As shown in Figs. 2, the tube 23 is of such length intermediate coiled portion 24 and the fluid container 21 that when the device is attached to the tank, an insulated covering 31b for the base plate of the box 30 will rest against the side of the tank just below the level gauge. Such an arrangement reduces to a minimum the length of tubing required so that the temperature responsive reaction is more nearly instantaneous and the cost of the device is lessened. Furthermore, this arrangement avoids the possibility of damage to the tube if stretched along the ground between the delivery truck and storage tank.

It may be well at this time to review the overall operation involved in the use of the device 20 for automatically shutting off the delivery of compressed liquefied gas to a tank 12 when it has reached a desired level in the tank. As the filling valve 14 of the hose is connected to the valve 14a of the tank, the coiled portion 24 of the tube 23 of the device is slipped over the outwardly projecting valve fitting, as shown in Fig. 2, and the outlet 16 of the valve fitting opened. In this position, the coiled portion serves both to attach the device to the fitting and also to dispose a portion of the tube 23 in position to be impinged upon by liquid escaping from outlet 16. Since the tube at this time is substantially at the same temperature as the ambient atmosphere, the diaphragm will be expanded so as to depress the plunger 25 into engagement with the contact elements of the micro-switch.

The lead lines 27 and 28 from the micro-switch 26 are connected across the ignition system of the truck, as indicated schematically in Fig. 3, and filling valve 14 is opened. With the truck motor running and the tank being filled by a pump operated from the power take-off mechanism of the truck, the switch 29 may be turned from its normal position at "B" to the position "A." Since the tube 23 is still at substantially the temperature of the ambient atmosphere so as to maintain the plunger 25 of the micro-switch depressed, the lead lines 27 and 28 will provide a closed circuit to continue operation of the pump.

As the liquid level rises in the tank, gas will escape from the outlet 16 and impinge upon the coiled portion 24. Although this has a certain amount of cooling effect, it is not sufficient to raise the plunger upon contraction of the diaphragm. However, as the level of the liquid reaches the valve and vaporizes upon escape from the outlet 16, the temperature drop is sufficiently great to contract the diaphragm and permit the plunger 25 to rise and disengage from the micro-switch contact elements.

This, of course, opens the switch 26 and the circuit in which it was connected so the pump is stopped and valve 14a automatically closes to shut off delivery of gas to the tank 12. The valve 14a may then be closed and part 18 turned to close outlet 16, so that the hose 13 and device 20 may be removed from the tank for use, together with the delivery truck, at another location. Of course, when the truck is to be moved to the next location, the ignition switch 29 is first moved back to position "B."

From the foregoing, it will be understood that after the deliveryman has moved switch 29 from position "B" to position "A," he may turn his attention from the filling operation with the assurance that delivery as well as the pump will be shut off automatically as the liquid reaches the level of the tank valve.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A device for use in automatically shutting off the delivery of a compressed liquefied gas to a storage tank when the liquid has reached a predetermined level within the tank, wherein the tank is of a type having a small outlet through a projection from the outer wall of the tank at said predetermined level so that, upon reaching such level, the liquid may escape through the outlet; said device comprising a fluid container having a diaphragm, a hollow tube closed at one end and communicating at its other end with the fluid container, means at the closed end of the tube for attaching the device to the projection in such a position that the liquid escaping from the outlet therethrough will impinge on the tube, said container and tube being filled with a fluid responsive to a temperature drop occasioned by the impingement of the liquid on the tube to permit contraction of the diaphragm from an expanded position, and a micro-switch having a plunger and contact elements responsive to actuation of the plunger for opening and closing an electrical circuit to which said elements are connectable, said switch plunger and diaphragm being connected for opening the circuit in response to contraction of the diaphragm, said attaching means comprising a coiled portion of the tube adapted to fit over the projection.

2. A device for use in automatically shutting off the delivery of a compressed liquefied gas to a storage tank when the liquid has reached a predetermined level within the tank, wherein the tank is of a type having a small outlet through a projection from the outer wall of the tank at said predetermined level so that, upon reaching such level, the liquid may escape through the outlet; said device comprising a box, a fluid container having a diaphragm within the box, a hollow tube closed at one end exteriorly of the box and communicating at its other end with the fluid container, means for suspending the box from the tank comprising a coiled portion of the closed end of the tube fittable over the projection in such a position as to be impinged upon by the escaping liquid, said container and tube being filled with a fluid normally adapted to hold the diaphragm in an expanded position but responsive to a temperature drop occasioned by the impingement of the liquid on said coiled portion of the tube to permit contraction of said diaphragm, a micro-switch within the box having a plunger and contact elements responsive to actuation of the plunger for opening and closing an electrical circuit to which said elements are connectable and a lever pivotally mounted in the box for engagement at one end with the diaphragm and adapted to bear upon the plunger at its other end to actuate same for opening the circuit in response to contraction of the diaphragm.

References Cited in the file of this patent

UNITED STATES PATENTS

| | | |
|---|---|---|
| 2,468,676 | Liben | Apr. 26, 1949 |
| 2,593,916 | Peff | Apr. 22, 1952 |
| 2,609,668 | Dalton | Sept. 9, 1952 |
| 2,678,541 | Sheen | May 18, 1954 |
| 2,756,765 | Agule | July 31, 1956 |
| 2,766,439 | Palm | Oct. 9, 1956 |